Patented Jan. 13, 1925.

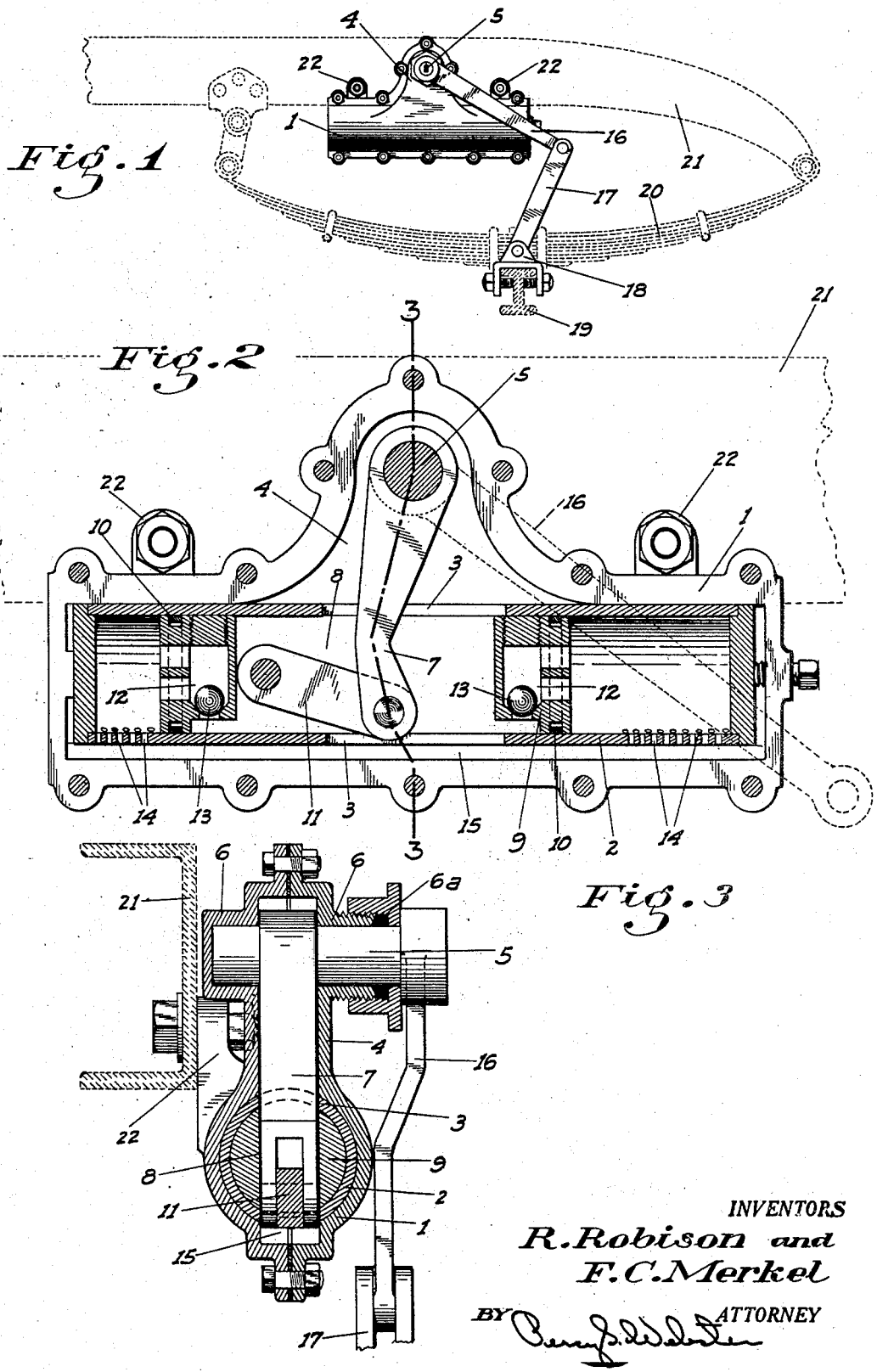

UNITED STATES PATENT OFFICE.

RUSSEL ROBISON AND FREDERICK C. MERKEL, OF JACKSON, CALIFORNIA.

SHOCK ABSORBER FOR USE ON AUTOMOBILES.

Application filed November 26, 1923. Serial No. 676,942.

*To all whom it may concern:*

Be it known that we, RUSSEL ROBISON and FREDERICK C. MERKEL, citizens of the United States, residing at Jackson, county of Amador, State of California, have invented certain new and useful Improvements in Shock Absorbers for Use on Automobiles; and we do declare the following to be a full, clear, and exact description of the same, reference being had to the accompanying drawings, and to the characters of reference marked thereon, which form a part of this application.

This invention relates to improvements in shock-absorbing devices for motor vehicles, and principally represents an improvement over that type of shock absorber shown in our copending application, Serial No. 660,316, filed August 31st, 1923.

The principal object of the present invention is to provide a shock-absorber operating on the same principle as the previous one, and with the same advantages, but having additional advantages in that it may be applied to the springs and frame of a car regardless of the spacing of the springs from the frame, and the fluid-containing body of which may be made to be set in any position desired or necessary without interfering with the efficiency of the shock absorber.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views:

Fig. 1 is a side elevation of the shock absorber as applied to a car, the fluid-containing body being set in a horizontal position.

Fig. 2 is a longitudinal section of the device, the parts being in their normal positions.

Fig. 3 is a cross section on the line 3—3 of Fig. 2.

Referring now more particularly to the characters of reference on the drawings, the numeral 1 denotes a substantially tubular casing, closed at both ends, and preferably made of two vertically split halves, for ease of manufacture and assembly.

Mounted in the casing lengthwise thereof, and held against rotative movement therein by the clamping together of the two parts of the casing, is a cylinder 2 provided with longitudinal and opposed slots 3 intermediate its ends, one of which slots faces a similarly disposed and hollow extension 4 formed with the casing in a radial plane thereof.

A shaft 5 is journaled in bearings 6 formed in the walls of this extension adjacent its end farthest from the axial line thereof; this shaft extending at right angles to said axial line and to the radial plane of the extension.

An arm 7 is fixed on the shaft 5 inside the part 4, said arm projecting through the cylinder slot and into a similarly disposed slot 8 which projects through a piston or plunger 9 intermediate the ends thereof, the piston being slidably mounted in the cylinder and beyond the slot 8 having a fluid-tight fit in the cylinder, as by means of rings 10.

The arm 7 is connected to the piston by a link 11, so that the latter will be reciprocated in the cylinder with the rotation of shaft 5.

The cylinder, beyond the piston, may have communication with the intermediate slot of the latter by reason of passages 12 in the piston, in which passages ball or similar automatically seating valves 13 are mounted; these valves opening towards their adjacent ends of the cylinder.

Said ends of the cylinder also communicate with each other at all times independent of the piston passages by means of longitudinally spaced orifices 14 in the cylinder wall for certain distances from each end; these orifices communicating with a longitudinal passage 15 formed in the casing, and which also communicates with the passage 12 of the pistons.

The shaft 5 projects outwardly of one of its bearings 6 through a stuffing box 6ª provided with the latter, and has fixed on said projecting end a lever 16 which extends downwardly at a suitable acute angle to a horizontal line, and has flexibly connected to its lower end a link 17, the opposite and lower end of which is similarly connected to a bracket or saddle 18 adapted to be clamped onto an axle 19 of a vehicle or onto the spring 20 adjacent said axle, as the case may be.

The casing itself is adapted to be rigidly mounted on the frame 21 of the car above said axle or spring by means of bolt-receiving lugs 22 formed with the casing 1 on the face thereof opposite to the lever 16 and parallel to the plane of the latter.

When installing the device on a vehicle, the lever 16 is at first left loose on the shaft (if its ultimate position is not known beforehand) while the casing 1 and bracket 18 are secured in their respective positions.

The shaft 5 is then turned to a predetermined position, which is that causing the piston to be disposed somewhat closer to the rear end of the cylinder than to the other, and the lever 16 is then tightened onto the shaft. The device is then ready for operation, the casing being first filled with a fluid, preferably oil.

When the frame 21 and spring 20 move relatively toward each other, the lever 16 is raised, and the piston 9 moved toward the right hand or forward end of the cylinder.

The holes 14 in that end of the cylinder are so located that with any normal deflection of the springs, the piston in its corresponding movement will not cover any of said holes, the combined area of which is thus available for the escape of the oil from the interior of the cylinder to the passage 15, the adjacent valve 13 being held closed by the pressure of the oil. At the same time, the opposite end valve 13 opens, allowing the oil to freely enter the corresponding end of the cylinder without depending on the flow through the adjacent holes 14. Thus the piston may move through a normal stroke without appreciable resistance.

When the piston however is driven beyond its normal limit of travel with an excessive spring deflection such as would be had when large bump or "chuck holes" are encountered by the wheels of the car, said piston passes one by one over the adjacent holes 14, gradually building up a pressure against the piston at that end, due to the fact that the area remaining for the escape of the oil from in front of the piston is being decreased, the said area decreasing in proportion to the movement of the piston beyond said normal limit of travel thereof. The result is that a gradually increasing resistance to the spring deflecting movement is had sufficient to resiliently stop said movement before the spring is compressed excessively and to a possible breaking point.

With the return of the spring from a deflected to normal position the piston offers a resistance sufficient to prevent a fly-back or quick rebound of the spring, due to the holes 14 in the rear end of the cylinder through which the fluid must then pass. With any rebound of the spring beyond its normal position however, the piston immediately starts to cover up said holes 14, with the result that an additional and constantly increasing resistance to the movement of the piston and consequently to the rebound of the spring is provided, thus preventing excessive rebound movement.

It is to be understood that while we have shown and described a certain definite arrangement of parts, the specific construction and arrangement of these may be varied should it be found desirable.

For instance, the ball valves may be mounted in the cylinder heads instead of in the piston. Also the cylinder and casing might be cast as one instead of as separate members.

By merely altering the position of seating of the valves, or by providing spring or other means to hold them closed, the casing may be mounted in other than the horizontal position shown, since the lever 16 not being permanently fixed on the shaft 5, may be always adjusted to have the same horizontal slant irrespective of the position of the casing and without interfering with the normal setting of the piston.

From the foregoing description it will be readily seen that we have produced such a device as substantially fulfills the objects of the invention as set forth herein.

Having thus described our invention what we claim as new and useful and desire to secure by Letters Patent is:

A shock absorber including a fixed casing having an enclosed longitudinal passage, a cylinder mounted in the casing, said cylinder having longitudinal and restricted passage means adjacent its ends and a relatively unrestricted passage intermediate the first passages, all said cylinder passages communicating with the casing passage, connected and spaced pistons reciprocable in the cylinder and normally disposed between the respective end passages and the intermediate passage of the cylinder, said pistons having passages therethrough, and check valves in said passages opening toward the adjacent ends of the cylinder.

In testimony whereof we affix our signatures.

RUSSEL ROBISON.
FREDERICK C. MERKEL.